(12) United States Patent
Kang (10) Patent No.: US 7,540,989 B2
(45) Date of Patent: Jun. 2, 2009

(54) METHOD OF USING INJECTION MOLDING MACHINE

(76) Inventor: Myung-Ho Kang, #201 Gumdong Family Town, 181-400, Sadang-dong, Dongiak-gu, Seoul 156-090 (KR)

( * ) Notice: Subject to any disclaimer, the term of this patent is extended or adjusted under 35 U.S.C. 154(b) by 0 days.

(21) Appl. No.: 11/860,414

(22) Filed: Sep. 24, 2007

(65) Prior Publication Data

US 2008/0054529 A1    Mar. 6, 2008

Related U.S. Application Data

(63) Continuation of application No. PCT/KR2005/002167, filed on Jul. 6, 2005.

(30) Foreign Application Priority Data

Mar. 24, 2005    (KR) .................. 10-2005-0024356

(51) Int. Cl.
*B29C 45/73* (2006.01)
(52) U.S. Cl. ................... 264/328.16; 425/548
(58) Field of Classification Search ............ 264/328.16, 264/327; 425/548
See application file for complete search history.

(56) References Cited

U.S. PATENT DOCUMENTS

| 5,656,234 A | 8/1997 | Kaneishi et al. |
| 6,544,024 B1 | 4/2003 | Yim |
| 2003/0215540 A1* | 11/2003 | Asai ..................... 425/547 |
| 2008/0054527 A1 | 3/2008 | Kang |

FOREIGN PATENT DOCUMENTS

| JP | 56-137942 A | 10/1981 |
| JP | 60-149424 A | 8/1985 |
| JP | 63-030213 A | 2/1988 |
| JP | 05-016742 A | 1/1993 |
| JP | 08-090624 A | 4/1996 |

(Continued)

OTHER PUBLICATIONS

International Search Report dated Dec. 6, 2005 in PCT Application No. PCT/KR2005/002167, which is the parent application of this application, in 3 pages.

(Continued)

*Primary Examiner*—Jill L Heitbrink
(74) *Attorney, Agent, or Firm*—Knobbe Martens Olson & Bear LLP (57) ABSTRACT

The molding apparatus includes a cavity mold with a cavity surface for defining a cavity in which a molten injection material is injected, and a core mold with a core surface for defining the cavity upon engagement with the cavity mold. The core mold has an intermediate core mold plate having the core surface and a support plate. A guide pin inserted into a guide hole formed in the cavity mold and fitted through the intermediate core mold plate to allow the intermediate core mold plate to be moved only in a forward and backward direction is fixed to the support plate. A first spring is installed between the intermediate core mold plate and the support plate, a first heating means is installed to a parting surface of the intermediate core mold plate and a cooling means is installed to the support plate.

28 Claims, 4 Drawing Sheets

FOREIGN PATENT DOCUMENTS

| | | |
|---|---|---|
| JP | 08-238648 A | 9/1996 |
| KR | 10-1999-0041963 A | 6/1999 |
| KR | 10-2003-0064484 A | 8/2003 |
| KR | 10-2003-0082487 A | 10/2003 |
| KR | 10-2003-0089426 A | 11/2003 |

OTHER PUBLICATIONS

Written Opinion dated Dec. 6, 2005 in PCT Application No. PCT/KR2005/002167, which is the parent application of this application, in 3 pages.

* cited by examiner

METHOD OF USING INJECTION MOLDING MACHINE

CROSS-REFERENCE TO RELATED PATENT APPLICATIONS

This application is a continuation application under 35 U.S.C. § 365(c) of International Application No. PCT/KR2005/002167, filed Jul. 6, 2005 designating the United States. International Application No. PCT/KR2005/002167 was published in English as WO2006/112571 A1 on Oct. 26, 2006. This application further claims the benefit of the earlier filing date under 35 U.S.C. § 365(b) of Korean Patent Application No. 10-2005-0024356 filed Mar. 24, 2005. This application incorporates herein by reference the International Application No. PCT/KR2005/002167 including the International Publication No. WO2006/112571 A1 and the Korean Patent Application No. 10-2005-0024356 in their entirety.

BACKGROUND

The present disclosure relates to injection molding, and more particularly, to heating and cooling of an injection molding machine.

A process of injection molding a synthetic resin or metal is a manufacturing method of injecting a molten synthetic resin or metal between a stationary mold (a cavity mold) with a cavity and a movable mold (a core mold) with a core and then cooling the injected synthetic resin or metal to obtain a molded product in the form of a cavity.

SUMMARY

One aspect of the invention provides an apparatus for injection molding, which comprises: a first mold comprising a first cavity surface; a second mold comprising a heating plate comprising a first surface, a second surface away from the first surface, and a heater located between the first and second surfaces, wherein the first surface comprises a second cavity surface opposing the first cavity surface, wherein the first and second cavity surfaces in combination are configured to define a molding cavity together with or without additional surfaces, wherein the heater is configured to generate heat in the heating plate, and a cooling plate comprising a cooling surface facing the heating plate; and wherein the heating plate is movable relative to the cooling plate between a first position and a second position, wherein the second surface contacts the cooling surface in the first position whereas the second surface is separated from the cooling surface in the second position.

In the foregoing apparatus, the first mold may be movable relative to the cooling plate and further movable relative to the heating plate. The first mold may comprise a passage configured to flow a moldable material toward the molding cavity. The heating plate may comprise a body, wherein the heater is embedded within the body. The body may comprise a first material and a second material interposed between the first material and the heater, wherein the second material may be configured to facilitate heat-transfer between the heater and the first material. The second material may have heat conductivity greater than that of the first material. The cooling plate may comprise a conduit configured to circulate a coolant therethrough.

Still in the foregoing apparatus, the first mold may comprises a second heating plate comprising a third surface, a fourth surface away from the third surface, and a second heater located between the third and fourth surfaces, wherein the third surface comprises the first cavity surface, wherein the second heater is configured to generate heat in the second heating plate, and a second cooling plate comprising a second cooling surface facing the second heating plate, and wherein the second heating plate may be movable relative to the second cooling plate between a third position and a fourth position, wherein the fourth surface may contact the second cooling surface in the third position whereas the fourth surface is separated from the second cooling surface in the fourth position. The second heating plate may be movable further relative to the heating plate, wherein the first surface and the third surface are configured to contact each other such that the heating plate and the second heating plate define the molding cavity.

Another aspect of the invention provides a method of injection molding, the method comprising: providing an injection molding apparatus comprising: a first mold comprising a first cavity surface, a second mold, the second mold comprising: a heating plate comprising a first surface, a second surface away from the first surface, and a heater located between the first and second surfaces, wherein the first surface comprises a second cavity surface opposing the first cavity surface, wherein the heater is configured to generate heat in the heating plate, and a cooling plate comprising a cooling surface facing the heating plate; turning on the heater so as to heat the heating plate; moving the heating plate relative to the first mold so as to form the molding cavity between the first and second cavity surfaces with or without additional surface; injecting a moldable material into the molding cavity; turning off the heater; and moving the cooling plate relative to the heating plate so as to contact the cooling surface with the second surface of the heating plate.

In the foregoing method, the method may further comprise: moving the heating plate relative to the first mold so as to separate the moldable material from one of the first and second cavity surfaces; and moving the cooling plate relative to the heating plate so as to separate the cooling surface from the second surface of the heating plate. The cooling plate may comprise a conduit for circulating a coolant therethrough, wherein the method further comprises circulating the coolant through the conduit. Circulating the coolant may be initiated before turning off the heater. Turning on the heater may occur prior to forming the molding cavity. Turning off the heater occurs after forming the molding cavity. Turning off the heater occurs after injecting the moldable material into the molding cavity. Turning off the heater occurs while injecting the moldable material into the molding cavity.

Still another aspect of the invention provides a method of injection molding, the method comprising: providing an injection molding apparatus comprising: a first mold comprising a first cavity surface, a second mold, the second mold comprising a heating plate comprising a second cavity surface opposing the first cavity surface, and a cooling plate comprising a cooling surface facing the heating plate; moving the heating plate relative to the first mold so as to form the molding cavity between the first and second cavity surfaces with or without additional surface; generating heat in the heating plate; injecting a moldable material into the molding cavity; moving the cooling plate relative to the heating plate such that the cooling surface contacts the heating plate; and cooling the cooling plate so as to enhance heat-transfer from the heating plate to the cooling plate.

In the foregoing method, cooling may be initiated prior to contacting the cooling surface with the heating plate. Cooling may be initiated prior to generating heat. Generating heat in the heating plate may be initiated prior to forming the molding cavity. Generating heat in the heating plate may end after injecting the moldable material into the molding cavity.

One aspect of the present invention provides a molding apparatus including heating and cooling means, wherein a mold is kept at a suitable temperature to maintain the flowing and transfer characteristics of an injected molten material and then cooled rapidly during and after an injection process to shorten a cycle time for the injection molding such that the productivity can be enhanced. That is, the aspect of the present invention is to provide a molding apparatus capable of solving a conflicting problem in that it takes much time to cool the mold and thus the cycle time for the injection molding may be increased when the temperature of the mold is increased, whereas the flowing and transfer characteristics may be deteriorated when the size of the mold is reduced to rapidly cool the mold.

Another aspect of the present invention provides a molding apparatus capable of manufacturing a high quality injection-molded product with no deformation by allowing each of regions on a mold surface to be kept at a desired temperature to control a cooling rate of the injection-molded product and also of reducing a cycle time.

One aspect of the present invention provides a molding apparatus comprising a cavity mold fixed to an injection molding machine and formed with a cavity surface for defining a cavity in which a molten injection material is injected, and a core mold formed with a core surface for defining the cavity upon engagement with the cavity mold and installed to the injection molding machine such that the core mold can be guided by a guide pin and moved forward and backward to open or close the cavity. Particularly, the core mold is divided into a thinner intermediate core mold plate having the core surface and a thicker core mold support plate such that the core mold can be kept at a suitable temperature when the molten injection material is injected and be rapidly cooled after the injection has been completed. Further, the core mold includes a guide pin which extends from the core mold support plate to be inserted into a guide hole formed in the cavity mold when moving toward the cavity mold and is fitted through the intermediate core mold plate to allow the intermediate core mold plate to be moved only in a forward and backward direction. Furthermore, the core mold includes a first spring which is installed between the intermediate core mold plate and the core mold support plate to allow the intermediate core mold plate and the core mold support plate to be separated from each other by means of elastic force when the core mold moves backward to open the cavity. In addition, a first heating means for heating the intermediate core mold plate is installed to a parting surface of the intermediate core mold plate, and a cooling means is installed to the core mold support plate such that the core mold support plate can be kept at a predetermined temperature to allow the internal core mold plate to be cooled when it is brought into contact with the intermediate core mold plate.

The core mold serving as a movable mold installed to be movable with respect to the cavity mold fixed to the injection molding machine is divided into the thinner intermediate core mold plate and the thicker core mold support plate. Further, prior to their engagement, the intermediate core mold plate is heated by the heating means to a temperature suitable for the injection molding, and the core mold support plate is cooled to a state where the intermediate core mold plate can be rapidly cooled when coming into contact with the intermediate core mold plate. During the injection of the molten material, the core mold support plate is moved toward the cavity mold to bring the intermediate core mold plate into close contact with the cavity mold. After the molten material has been completely injected, the operation of the heating means is stopped and the intermediate core mold plate brought into contact with the core mold support plate is rapidly cooled. Thus, the temperature of the core surface is suitably kept to ensure excellent flowing and transfer characteristics while the molten injection material is injected. In addition, since the molding apparatus can be rapidly cooled at the same time when the injection of the molten material has been completed, a cycle time for the injection molding can be further shortened.

In order to improve a cooling effect of the intermediate core mold plate, the parting surfaces of the intermediate core mold plate and the core mold support plate are preferably brought into close contact with each other. Thus, a coil spring is used as the first spring such that the guide pin can be inserted therein. Preferably, a circular hole with a predetermined depth is formed at an edge portion of the core mold support plate to which the guide pin is fixed such that the first spring can be completely inserted in the circular hole when the core mold support plate moves forward.

Further, the cavity mold of the molding apparatus may be divided into a thinner intermediate cavity mold plate formed with a cavity surface and a thicker cavity mold support plate formed with a second guide hole such that the cavity surface as well as the core surface can be kept at a suitable temperature when the molten injection material is injected in the cavity and be rapidly cooled after the injection has been completed. In addition, the cavity mold includes a hollow guide cylinder having one end fixed through the intermediate cavity mold plate and the other end fitted into the second guide hole of the cavity mold support plate to allow the intermediate cavity mold plate to be moved only in a forward and backward direction, and a second spring installed between the intermediate cavity mold plate and the cavity mold support plate to allow the intermediate cavity mold plate and the cavity mold support plate to be separated from each other by means of elastic force when the core mold moves backward to open the cavity. A second heating means for heating the intermediate cavity mold plate is installed to the parting surface of the intermediate cavity mold plate and a second cooling means for cooling the cavity mold support plate is provided.

If the cavity mold is divided into the intermediate cavity mold plate and the cavity mold support plate in the same manner as the core mold, the intermediate cavity mold plate is heated by the heating means to a temperature suitable for the injection molding and the cavity mold support plate is cooled to a state where the intermediate cavity mold plate can be rapidly cooled when coming into contact with the intermediate cavity mold plate before the plates are engaged with each other. That is, the core mold support plate is moved toward the cavity mold and the injection of the molten material into the cavity is completed in a state where the intermediate core mold plate, the intermediate cavity mold plate and the cavity mold support plate are brought into close contact with the cavity mold and all the cavity surfaces are kept at a temperature suitable for the injection molding by stopping the operations of the first and second heating means. After the molten material has been completely injected, the whole cavity can be rapidly cooled. Thus, the temperatures of the core and cavity surfaces are suitably kept to ensure excellent flowing and transfer characteristics while the molten injection material is injected. In addition, since the molding apparatus can be rapidly cooled at the same time when the injection of the molten material has been completed, a cycle time for the injection molding can be further shortened.

In order to improve a cooling effect of the intermediate cavity mold plate, the parting surfaces of the intermediate cavity mold plate and the cavity mold support plate are preferably brought into close contact with each other. That is, it is preferred that a coil spring be used as the second spring through which the hollow guide cylinder is inserted, and a large-diameter portion with a predetermined depth be formed in the second guide hole of the cavity mold support plate to allow the second spring to be completely inserted therein when the intermediate cavity mold plate moves backward. Furthermore, the hollow interior of the guide cylinder is used as the first guide hole in which the guide pin can be inserted when the core mold moves toward the cavity mold. In such a case, the structure of the molding apparatus can be advantageously simplified.

An electric heater capable of easily adjusting an amount of heat is used as the first and second heating means. Particularly, the first and second heating means are installed in the grooves formed in the parting surfaces of the mold plates such that they are brought into contact with the intermediate core mold plate and the intermediate cavity mold plate to directly and effectively transfer heat generated from the heating means. Further, in order to facilitate the heat transfer by increasing a contact area between the intermediate core mold plate and the core mold support plate, a copper material is preferably filled in a space between the electric heater and the groove in which the electric heater is inserted. In addition, a temperature sensor may be installed to the intermediate core mold plate to control the amount of heat generated from the electric heater such that the core mold can be maintained within a certain range of temperature. The first and second cooling means include coolant pipes inserted in the core mold support plate such that a coolant can flow therein. Furthermore, a single heating wire may be used in the electric heater, but a plurality of heating wires are preferably used to control the temperature of the cavity or core surface according to the regions thereon and consequently to independently adjust the amounts of heat. If the temperature control is made on the respective regions on the mold surface, a cooling rate for an injection-molded product can be controlled to thereby preventing the deformation caused by residual stress such that high quality products can be produced. Alternatively, the cooling rate can also be increased to shorten the cycle time and thus to enhance the productivity.

BRIEF DESCRIPTION OF THE DRAWINGS

FIGS. 4(a) and (b) are schematic views each showing an example of an electric heater of the intermediate core mold plate used in the molding apparatus of FIG. 1.

Following are representative elements appearing on the drawings and their reference numerals.

| | |
|---|---|
| 10: Cavity mold fixing plate | 20: Fixed cavity mold |
| 30: Intermediate core mold plate | 33: Electric heater |
| 35: Core mold bushing | 40: Core mold support plate |
| 41: Guide pin | 43: Cooling pipe |
| 50: Core mold fixing plate | 60: Intermediate cavity mold |
| 70: Cavity mold support plate | 80: Temperature sensor |

DETAILED DESCRIPTION OF EMBODIMENTS

Hereinafter, embodiments of the present invention will be described in detail with reference to the accompanying drawings.

In the injection molding process, it is preferred that the mold have the same temperature as the molten material, if possible, when the molten material is injected. The reason is that the flowing characteristic of the injected material and the transfer characteristic of a pattern onto a cavity surface can be improved and the deformation caused by residual stress after the molten material is hardened can also be reduced. Further, it is preferred that the mold have a lower temperature after the molten material is completely injected so that the injected material can be rapidly cooled and a cycle time for the injection molding can also be shortened to enhance its productivity. However, if the mold is beforehand heated to increase its temperature, the flowability and transferability are enhanced but it takes long time to cool the mold. Thus, a cycle time for the injection molding may be increased. On the other hand, in a case where the volume of the mold is decreased such that the mold can be rapidly cooled to shorten a cycle time for the injection molding, the stiffness or rigidity of the mold may be weakened. Thus, a molded product may be deformed or its durability may be deteriorated.

Figure 1:
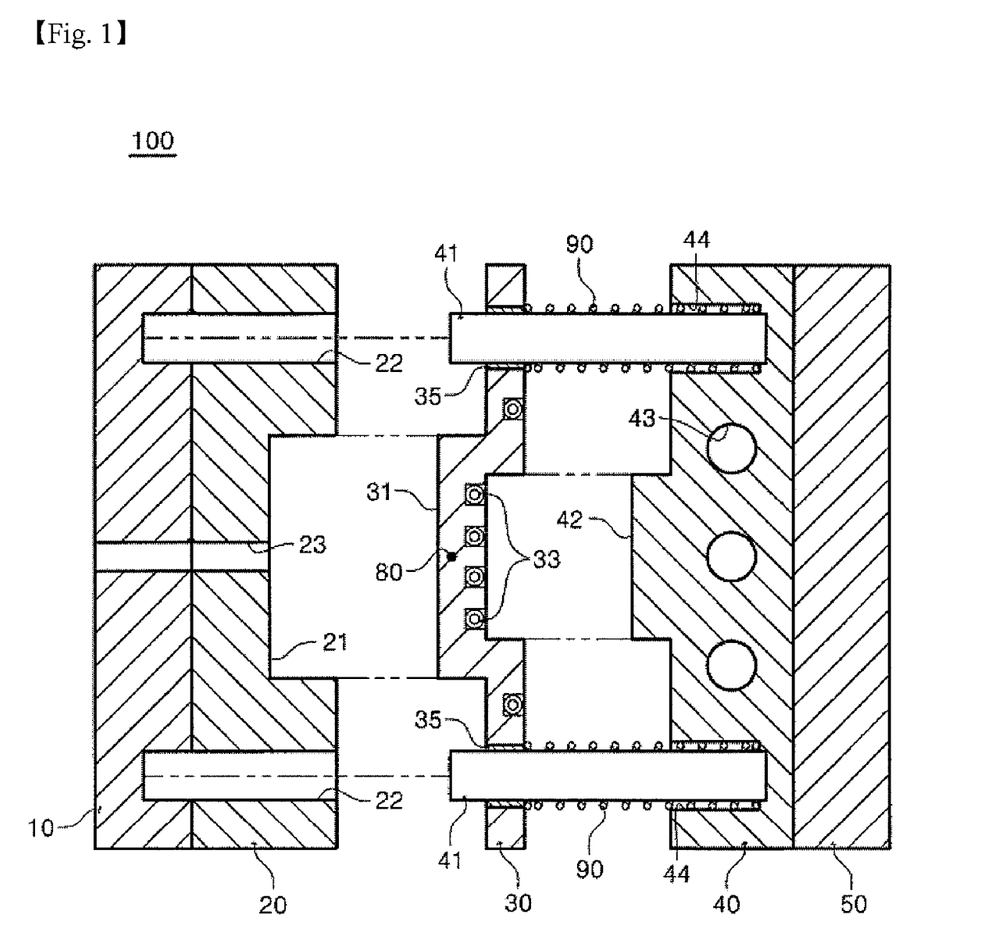
FIG. 1 is a schematic view showing a molding apparatus in an open state according to an embodiment of the present invention.
Figure 2:
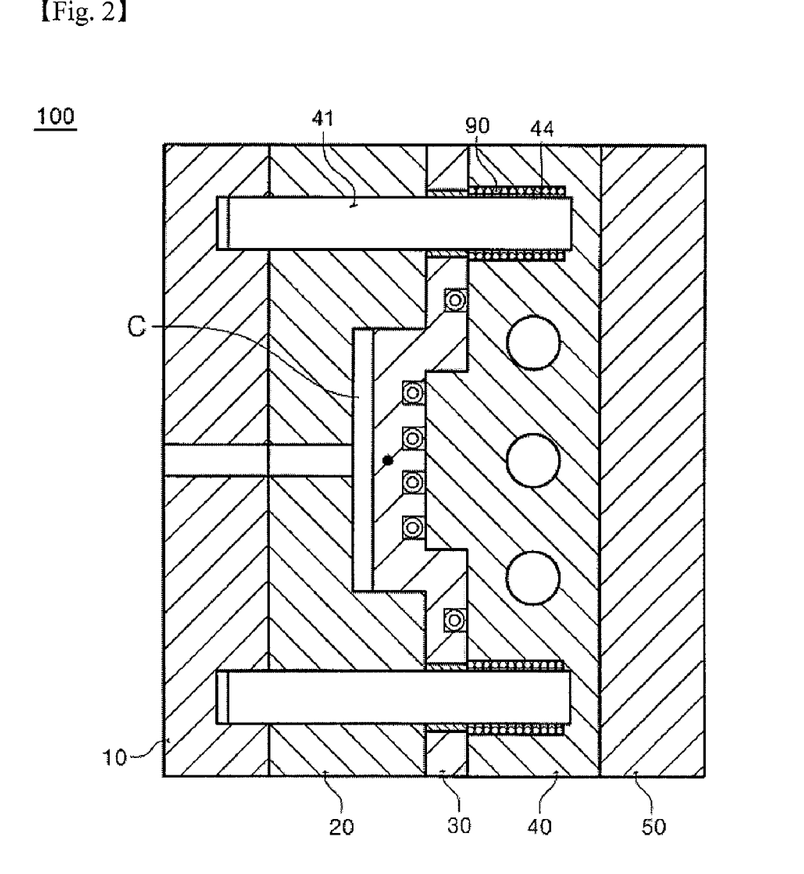
FIG. 2 is a schematic view showing the molding apparatus of FIG. 1 in a closed state.
Figure 3:
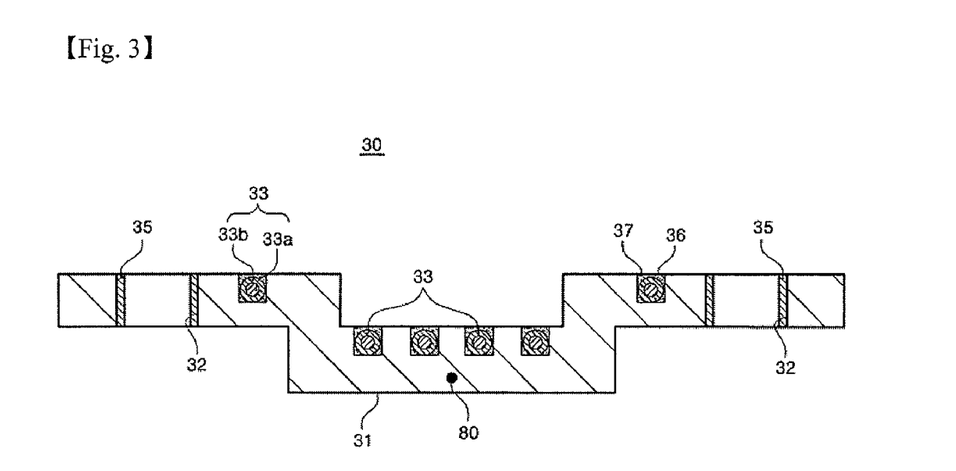
FIG. 3 is a detailed view showing an electric heater of an intermediate core mold plate used in the molding apparatus of FIG. 1.

FIG. 1 is a schematic view showing a molding apparatus in an open state according to an embodiment of the present invention, FIG. 2 is a schematic view showing the molding apparatus of FIG. 1 in a closed state, FIG. 3 is a detailed view showing an electric heater of an intermediate core mold plate used in the molding apparatus of FIG. 1, and FIGS. 4(a) and (b) are schematic views each showing an example of an electric heater of the intermediate core mold plate used in the molding apparatus of FIG. 1.

As shown in FIG. 1, a molding apparatus 100 of this embodiment includes a cavity mold 20 to be fixed to an injection molding machine (not shown), an intermediate core mold plate 30 installed to be guided by guide pins 41 and slid toward or away from the cavity mold 20, and a core mold support plate 40 fixed to a core mold fixing plate 50 movably installed to the injection molding machine. Further, the guide pins 41 fitted into bushings 35 of the intermediate core mold plate 30 are fixed to the core mold support plate 40. The cavity mold 20 is formed with a cavity surface 21 in which a molten injection material is injected, and the molten injection material is injected in the cavity surface 21 through an injection passage 23. In addition, the cavity mold 20 is formed with guide holes 22 into which the guide pins 41 are inserted. A core surface 31 is formed on a side of the intermediate core mold plate 30 facing the cavity surface 21. Referring to FIG. 2 showing a state where the cavity mold 20 and the intermediate core mold plate 30 are engaged with each other, the core surface 31 and the cavity surface 21 define a cavity C in which the molten injection material is injected. The intermediate core mold plate 30 is shaped as a plate thinner than the core mold support plate 40 to allow the mold to be easily heated and cooled.

Figure 4:
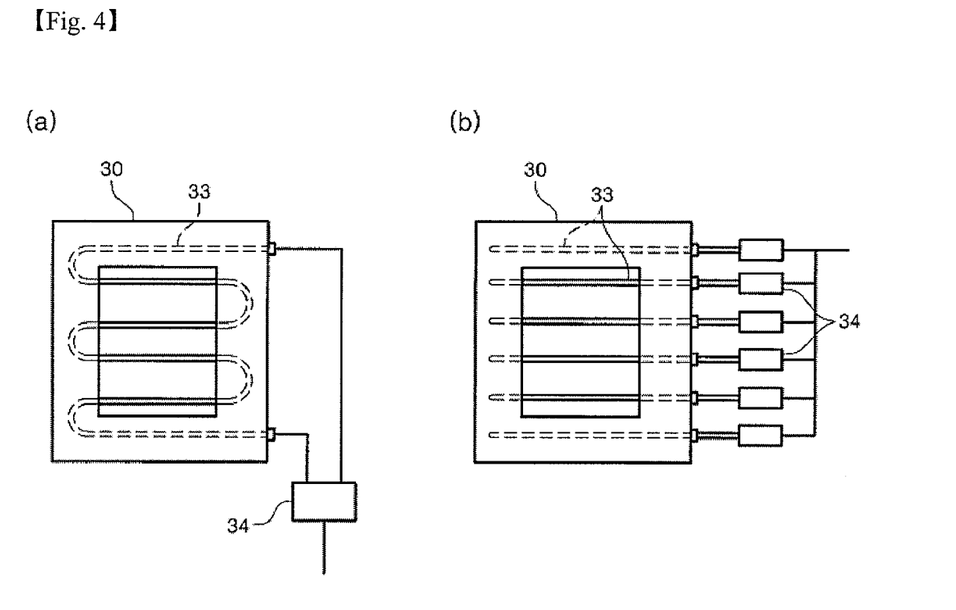

Referring to FIGS. 1 and 2, a plurality of grooves 37 are formed in a parting surface of the intermediate core mold plate 30, and electric heaters 33 used for heating the intermediate core mold plate 30 are inserted in the grooves 37. Referring to FIG. 3, each of the electric heaters 33 is configured in such a manner that an insulation coating 33b surrounds a heating wire 33a such as a nichrome wire. Further, in order to increase a contact area between the intermediate core mold plate 30 and the core mold support plate 40 and also facilitate heat transfer, a copper material 36 is filled in a space between the electric heater 33 and the groove 37 in which the electric heater 33 is inserted. Referring to FIG. 4, a single heating wire (FIG. 4(a)) or a plurality of heating wires (FIG. 4(b)) may be employed in the electric heater 33. Reference numeral 34 designates a controller for adjusting an amount of heat from the electric heater 33. In a case where a number of the heating wires are used, the total amount of heat from the electric heaters 33 can be suitably adjusted such that the temperature of the core surface 31 of the intermediate core mold plate 30 can be uniform. In addition, a temperature sensor 80 is installed to the intermediate core mold plate 30. The temperature sensor 80 is used to measure the temperature of the intermediate core mold plate 30 in real time such that the controller 34 can suitably adjust the amount of heat from the electric heater to cause the core mold plate to be maintained within a certain range of temperature. Although it has been illustrated in this embodiment that a single temperature sensor is used, a plurality of temperature sensors may be installed and employed if necessary. Particularly, if the amounts of heat from the respective electric heaters are to be controlled such that respective regions on the mold surface have different temperatures from one another, it is preferred that the temperature sensors be installed to the desired regions on the core surface where different temperatures are set.

In addition, a cooling means is installed to the core mold support plate 40 to keep the core mold support plate 40 at a certain temperature such that the intermediate core mold plate 30 can be cooled when the core mold support plate 40 comes into contact with the intermediate core mold plate 30. In this embodiment, the cooling means includes a coolant tank (not shown), a pump for circulating coolant, and a coolant pipe 43 formed in the core mold support plate 40. The coolant pipe 43 is connected in the core mold support plate 40 and inlet and outlet ports (not shown) are formed in sides of the core mold support plate 40.

Further, coil springs 90 are inserted around the guide pins 41 between the intermediate core mold plate 30 and the core mold support plate 40. When the core mold support plate 40 moves backward to open the cavity, the coil springs 90 allow the intermediate core mold plate 30 and the core mold support plate 40 to be separated from each other by means of their elastic force such that the intermediate core mold plate 30 can be rapidly heated by means of the electric heaters 33 but cannot be cooled by means of the core mold support plate 40. In particular, as shown in FIG. 2, after a molten material has been injected into the cavity C formed by bringing the intermediate core mold plate 30 into close contact with the cavity mold 20, the parting surfaces of the intermediate core mold plate 30 and the core mold support plate 40 are preferably brought into close contact with each other to improve the cooling effect of the intermediate core mold plate 30. Thus, each of the coil springs is used as a first spring 90 and inserted around the guide pin 41. As shown in FIG. 2, when the core mold support plate 40 is moved to come into contact with the intermediate core mold plate 30, the coil springs 90 are completely inserted into circular holes 44 each having a constant depth and formed at edge regions of the core mold support plate to which the guide pins 41 are fixed.

Hereinafter, the operation and advantageous effects of this embodiment will be described. A method of manufacturing an injection-molded product using the molding apparatus according to this embodiment is explained, as follows. First, in a state of FIG. 1 where the molding apparatus 100 of this embodiment is installed to an injection molding machine, an electric current is supplied to the electric heaters to heat the intermediate core mold plate 30 to a temperature suitable for the injection molding. At the same time, a coolant flows into the cooling pipe 43 of the core mold support plate 40 such that the core mold support plate 40 can be kept at a predetermined temperature to provide the effective cooling of the core mold support plate. If the intermediate core mold plate 30 and the core mold support plate 40 reach a predetermined temperature suitable for the injection molding and cooling, the core mold fixing plate 50 is moved in a leftward direction as viewed from the figure (toward the cavity mold) such that the cavity mold 20, the intermediate core mold plate 30, and the core mold support plate 40 are brought into close contact with one another. Then, a molten injection material is injected into the cavity C defined as shown in FIG. 2 and electric power of the electric heater is turned off during the injection process or at the time when the injection process has been completed. If the injection process is completed and the injection material is completely solidified, the core mold fixing plate 50 is moved backward (in a rightward direction as viewed from the figure) such that the guide pins 41 are removed from the guide holes 22. At this time, the intermediate core mold plate 30 is separated from the core mold support plate 40 due to the restoring forces of the coil springs 90 to prevent the intermediate core mold plate from being cooled by the core mold support plate, and simultaneously, electric power is supplied to the electric heaters 33 to cause the intermediate core mold plate 30 to be heated. The injection-molded product is removed from the cavity C and the aforementioned processes are repeated for the injection molding.

If the molding apparatus of this embodiment is employed, the intermediate core mold plate 30 is heated by means of the heating means prior to their engagement to keep the plate at a temperature suitable for the injection molding and the core mold support plate 40 is cooled such that it can rapidly cool the intermediate core mold plate when coming into contact with the intermediate core mold plate. After the engagement of the plates, the injection molding process is executed while the intermediate core mold plate 30 is rapidly cooled by means of the core mold support plate 40. Thus, the core surface can be kept at a suitable temperature to ensure excellent flowing and transfer characteristics when the molten injection material is injected and the molding apparatus can be rapidly cooled simultaneously when the injection of material has been completed, so that a cycle time for the injection molding can be shortened. In particular, in a case where the heating means is configured such that a plurality of electric heaters can be independently controlled, respective regions on the mold surface may have different temperatures to prevent an injection-molded product to be deformed by the residual stress when the product is cooled, so that a high quality injection-molded product can be produced and a cooling rate can also be controlled to further shorten the cycle time.

Figure 5:
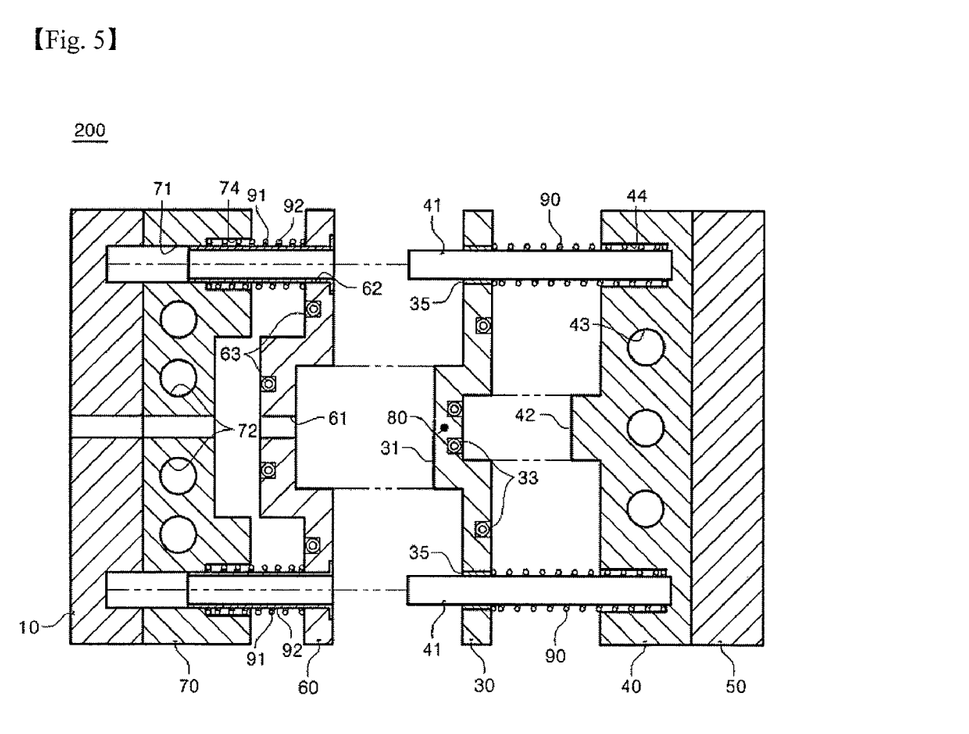
FIG. 5 is a schematic view showing a molding apparatus in an open state according to another embodiment of the present invention.
Figure 6:
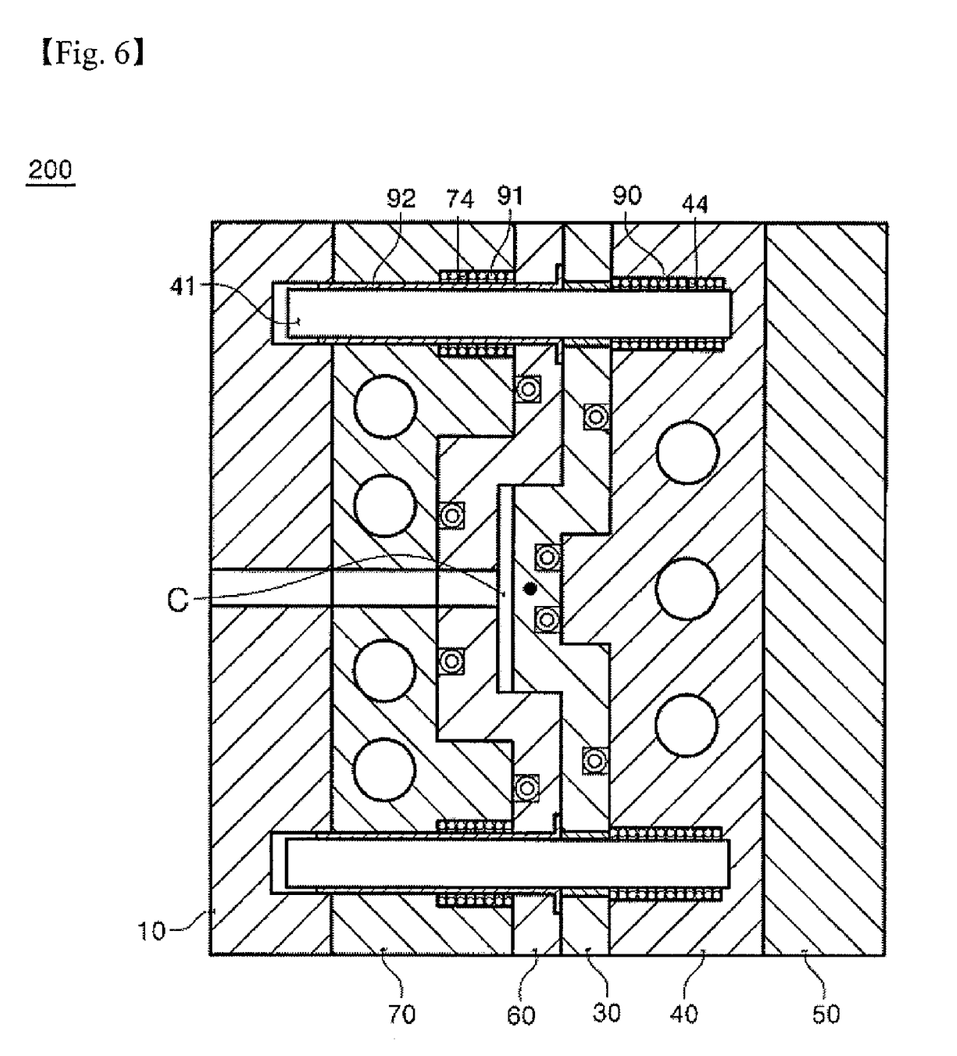
FIG. 6 is a schematic view showing the molding apparatus of FIG. 5 in a closed state.

FIG. 5 is a schematic view showing a molding apparatus according to another embodiment of the present invention in an open state and FIG. 6 is a schematic view showing the molding apparatus of FIG. 5 in a closed state.

The molding apparatus of FIG. 5 is different from that of FIG. 1 in that the cavity mold 20 is also divided into an intermediate cavity mold plate 60 and a cavity mold support plate 70 in the same manner as the core mold, and that electric heaters are also installed to a parting surface of the intermediate cavity mold plate 60 and cooling pipes are also formed in the cavity mold support plate 70. Further, the molding apparatus of an embodiment includes hollow guide cylinders 92 each having one end fixed through the intermediate cavity mold plate 60 and the other end fitted into a second guide hole 71 formed in the cavity mold support plate 70 such that the intermediate cavity mold plate 60 can be moved in a direction with respect to the cavity mold support plate 70. In addition, as shown in FIG. 5, coil springs 91 are inserted into the guide cylinders 92 such that the intermediate cavity mold plate 60 can be disengaged from the cavity mold support plate 70 when the intermediate cavity mold plate 60 and the intermediate core mold plate 30 are in an open state. Referring to FIG. 6, large-diameter portions 74 are formed in series with the second guide holes 71 in which the guide cylinders 92 are inserted such that the second springs 91 are completely inserted therein in order to bring the intermediate cavity mold plate 60 and the cavity mold support plate 70 into close contact with each other, in the same manner as the circular holes 44 are formed on the core mole support plate 40 at positions where the guide pins 41 are fixed such that the core mold support plate 40 can be brought into close contact with the intermediate core mold plate 30. Although an eject pin for removing an injection-molded product from the molding apparatus is not illustrated in this embodiment, an eject pin is installed to eject a product molded through the intermediate cavity or core mold plates from the molding apparatus in a case where the product is not automatically ejected from the molding apparatus.

A method of using the molding apparatus according to this embodiment is identical to that of the previous embodiment, except that the intermediate cavity mold plate 60 is heated to a predetermined temperature suitable for the injection molding before the injection molding process and the cavity mold support plate 70 is cooled beforehand to a predetermined temperature suitable for the cooling of the material injected in the cavity.

The molding apparatus of this embodiment is configured such that the cavity mold is divided into the intermediate cavity mold plate and the cavity mold support plate in the same manner as the core mold. Thus, the intermediate cavity mold plate is heated by a heating means to a temperature suitable for the injection molding before the engagement, and the cavity mold support plate is cooled and maintained at a state where the intermediate cavity mold plate can be rapidly cooled when coming into contact with the intermediate cavity mold plate. Thus, when a molten injection material is injected, the cavity surface and the core surface are kept at a temperature suitable for the injection molding, thereby ensuring the excellent flowing and transfer characteristics. In addition, since the molding apparatus can be rapidly cooled at the time when the material has been completely injected, a cycle time for the injection molding can be shortened. In particular, since the electric heaters are installed to both the intermediate cavity mold plate and the intermediate core mold plate, the cycle time may be further shortened when a cooling rate is controlled by setting the temperatures of the mold plates to be different from each other.

According to embodiments of the present invention, a molding apparatus including separate intermediate core and cavity mold plates. The separate intermediate core and cavity mold plates are heated to a suitable temperature using the electric heaters before the injection molding and rapidly cooled by means of the previously cooled and separated core and cavity mold support plates such that the molding apparatus has excellent flowing and transfer characteristics and thus excellent productivity due to the shortened cycle time for the injection molding. In particular, since a plurality of electric heaters can be used to allow respective regions on the mold surface to be maintained at the different temperatures, a cooling rate of the product can be controlled to prevent the product from being deformed due to the residual stress. Furthermore, since the cycle time can be further shortened, the molding apparatus with excellent productivity can be obtained.

Embodiments described above and illustrated in the drawings should not be construed as limiting a technical spirit of the present invention. The scope of the present invention is defined only by the appended claims, and various changes and modifications may be made within the spirit and scope of the invention by those skilled in the art. Thus, such changes and modifications will be included in the scope of the present invention.

What is claimed is:

1. A method of injection molding, the method comprising:
providing an injection molding apparatus comprising:
a first mold comprising a first cavity surface,
a second mold comprising:
a heating plate comprising a first surface, a second surface facing away from the first surface, and at least one channel arranged in a body of the heating plate between the first and second surfaces, wherein the first surface comprises a second cavity surface opposing the first cavity surface,
a plurality of heating extensions passing through the at least one channel and configured to generate heat for heating the heating plate, and
a cooling plate comprising a cooling surface facing the heating plate;
controlling the plurality of heating extensions so as to heat the heating plate;
moving the heating plate relative to the first mold so as to form the molding cavity between the first and second cavity surfaces with or without additional surface;
injecting a moldable material into the molding cavity; and
moving the cooling plate relative to the heating plate so as to contact the cooling surface with the second surface of the heating plate.

2. The method of claim 1, further comprising:
moving the heating plate relative to the first mold so as to separate the moldable material from one of the first and second cavity surfaces; and
moving the cooling plate relative to the heating plate so as to separate the cooling surface from the second surface of the heating plate.

3. The method of claim 1, wherein the cooling plate comprises a conduit for circulating a coolant therethrough, wherein the method further comprises circulating the coolant through the conduit.

4. The method of claim 3, wherein controlling comprises turning on the plurality of heating extensions and turning off the plurality of heating extensions, wherein circulating the coolant is initiated before turning off the plurality of heating extensions.

5. The method of claim 1, wherein controlling comprises turning on the plurality of heating extensions and turning off the plurality of heating extensions, wherein turning on the plurality of heating extensions occurs prior to forming the molding cavity.

6. The method of claim 1, wherein controlling comprises turning on the plurality of heating extensions and turning off the plurality of heating extensions, wherein turning off the plurality of heating extensions occurs after forming the molding cavity.

7. The method of claim 1, wherein controlling comprises turning on the plurality of heating extensions and turning off the plurality of heating extensions, wherein turning off the plurality of heating extensions occurs after injecting the moldable material into the molding cavity.

8. The method of claim 1, wherein controlling comprises turning on the plurality of heating extensions and turning off the plurality of heating extensions, wherein turning off the plurality of heating extensions occurs while injecting the moldable material into the molding cavity.

9. The method of claim 1, wherein the at least one channel is at least one groove formed into the second surface of the heating plate.

10. The method of claim 1, wherein a metallic material is interposed between a first one of the plurality of heating extensions and the body within the at least one channel for heat transfer from the first heating extension to the body.

11. The method of claim 1, wherein at least two of the plurality of heating extensions extend generally parallel to each other.

12. The method of claim 1, wherein the plurality of heating extensions are integrated in a single piece heater.

13. The method of claim 1, wherein the plurality of heating extensions comprises at least two substantially linear extensions and at least one curved extension interconnecting the at least two substantially linear extensions.

14. The method of claim 1, wherein the plurality of heating extensions are electrically connected via a conductive line.

15. The method of claim 1, wherein two or more of the plurality of heating extensions are independently controlled.

16. The method of claim 1, wherein at least two of the plurality of heating extensions are at different distances from the second cavity surface in a direction of relative movement of the cooling plate.

17. A method of injection molding, the method comprising:
   providing an injection molding apparatus comprising:
      a first mold comprising a first cavity surface,
      a second mold comprising:
         a heating plate comprising a second cavity surface opposing the first cavity surface, and at least one channel arranged in a body of the heating plate,
         a plurality of heating extensions passing through the at least one channel, and
         a cooling plate comprising a cooling surface facing the heating plate;
   moving the heating plate relative to the first mold so as to form the molding cavity between the first and second cavity surfaces with or without additional surface;
   generating heat from the plurality of heating extensions, thereby heating the heating plate;
   injecting a moldable material into the molding cavity;
   moving the cooling plate relative to the heating plate such that the cooling surface contacts the heating plate; and
   cooling the cooling plate so as to enhance heat-transfer from the heating plate to the cooling plate.

18. The method of claim 17, wherein cooling is initiated prior to contacting the cooling surface with the heating plate.

19. The method of claim 17, wherein cooling is initiated prior to generating heat.

20. The method of claim 17, wherein generating heat in the heating plate is initiated prior to forming the molding cavity.

21. The method of claim 17, wherein generating heat in the heating plate ends after injecting the moldable material into the molding cavity.

22. The method of claim 17, wherein the at least one channel is at least one groove formed into the second surface of the heating plate.

23. The method of claim 17, wherein a metallic material is interposed between a first one of the plurality of heating extensions and the body within the at least one channel for heat transfer from the first heating extension to the body.

24. The method of claim 17, wherein at least two of the plurality of heating extensions extend generally parallel to each other.

25. The method of claim 17, wherein the plurality of heating extensions are integrated in a single piece heater.

26. The method of claim 17, wherein the plurality of heating extensions comprises at least two substantially linear extensions and at least one curved extension interconnecting the at least two substantially linear extensions.

27. The method of claim 17, wherein at least two of the plurality of heating extensions are at different distances from the second cavity surface in a direction of relative movement of the cooling plate.

28. The method of claim 17, wherein two or more of the plurality of heating extensions are independently controlled.

* * * * *